April 7, 1970   W. M. WEICHSEL   3,504,816
CONTAINER FOR A FOOD BLENDER AND LIQUEFIER
Filed Aug. 28, 1968
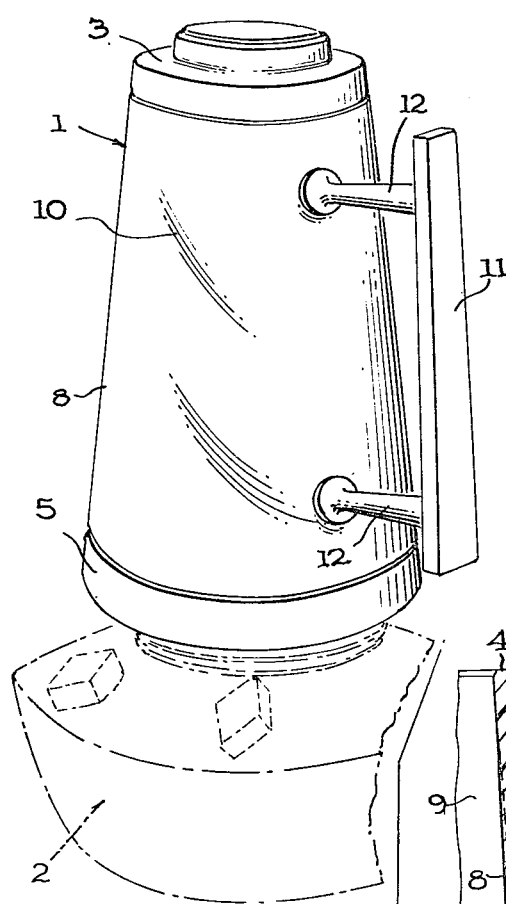
FIG. 1.
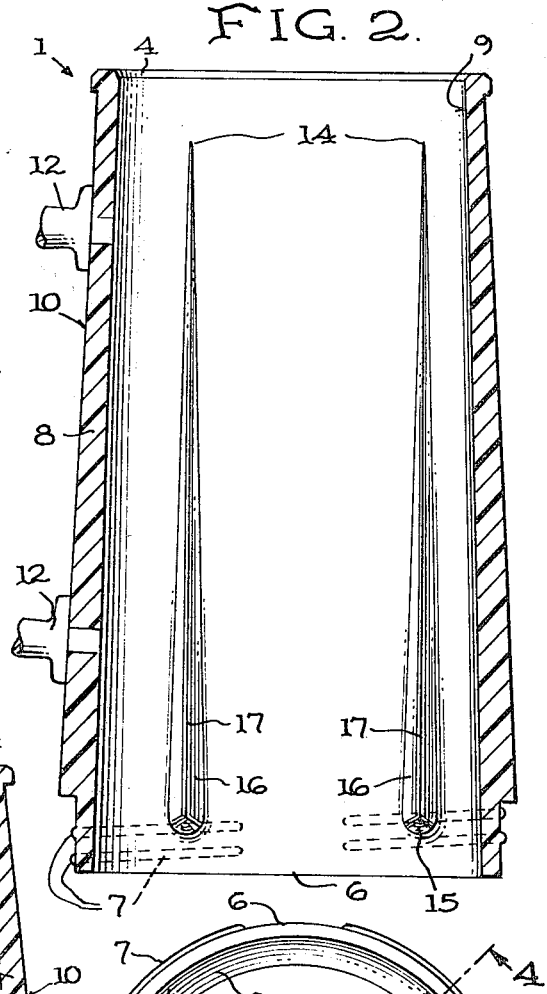
FIG. 2.
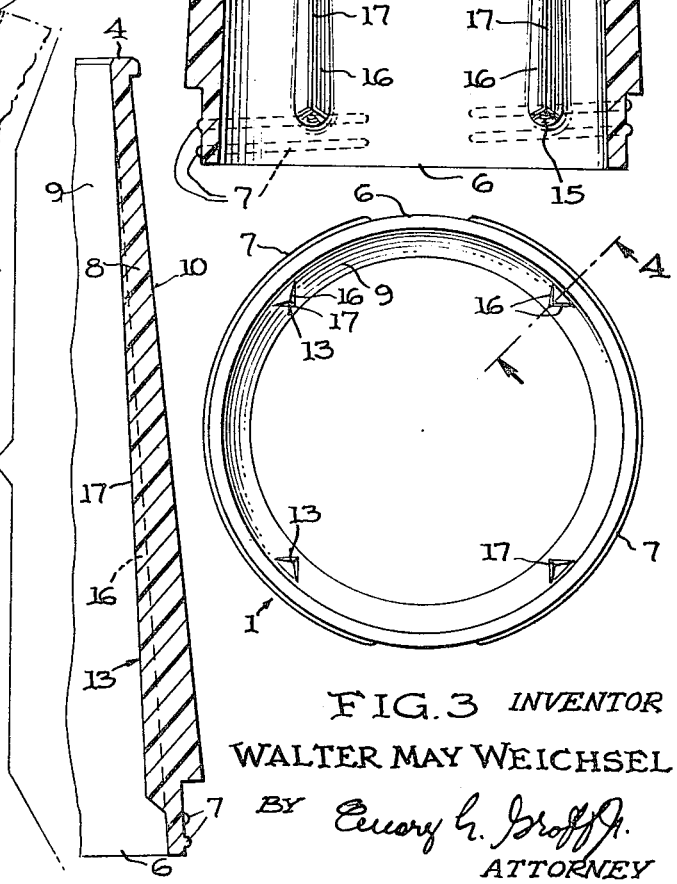
FIG. 4.
FIG. 3
INVENTOR
WALTER MAY WEICHSEL
BY Emory G. Groff Jr.
ATTORNEY

United States Patent Office

3,504,816
Patented Apr. 7, 1970

3,504,816
CONTAINER FOR A FOOD BLENDER AND LIQUEFIER
Walter May Weichsel, Mexico City, Mexico, assignor to Motores y Aparatos Electricos, S.A. de C.V., Mexico City, Mexico, a corporation of Mexico
Filed Aug. 28, 1968, Ser. No. 755,841
Claims priority, application Mexico, Feb. 29, 1968, 101,800
Int. Cl. B65d 23/00
U.S. Cl. 215—1                            10 Claims

ABSTRACT OF THE DISCLOSURE

A vessel having an inner cavity defined by a wall inclined inwardly from the bottom to the top thereof. Self-clearing means are included on the inner surface of the wall and a base unit is removably attached to the bottom of the vessel.

---

This invention relates generally to receptacles or containers, and more particularly to a vessel especially adapted to be used with a blender of the household appliance type.

Food blenders have become increasingly popular and practically all such household appliances comprise a vessel having a rotary chopping or cutting blade assembly disposed in the lower portion thereof and which is adapted to be placed upon a base unit that contains the motor means for operating the blade assembly. Until the present invention, the vessel portion of the blender assembly has comprised a cylindrical or otherwise shaped upright element having either vertical walls or a wall contruction which diverges outwardly from the base to the top of the vessel. A primary disadvantage of such vessels has been that, particularly when a dry product is being blended, the material becomes caked or otherwise jammed against the inner periphery of the vessel and thus fails to properly circulate to permit all of the material to be equally operated upon by the rotating cutting blades located in the bottom of the vessel. The very inward taper of such a vessel wall increases the likelihood of caking as the weight of the material produces a wedge action from the top to the bottom of the vessel.

In the prior known vessel arrangements, the only solution to insure adequate blending of the ingredients has been to repeatedly turn off and on the motor unit controlling the cutting blades in order to encourage the partially ground or pulverized material within the vessel to settle back down toward the central bottom portion of the vessel. Even with this inconvenience, it has often been necessary to additionally insert an implement into the top of the vessel in order to forcibly scrape or dislodge material which has become jammed within the vessel and even stuck to the inner walls thereof.

The present invention seeks to overcome the foregoing disadvantages and provides a unique arrangement wherein the vessel walls slope outwardly from the top to the bottom of the vessel. As a further inducement to encourage free flowing of the material within the vessel, a plurality of specially shaped ribs are provided on the inner periphery of the vessel. These two features of the present invention combine to contribute to a thorough circulation of material within the vessel during operation of the cutting blades therein to the extent that caking, bridging or jamming of the material is precluded without the necessity of repeatedly stopping and starting the motor unit of the blender or inserting a scraper implement into the vessel.

Accordingly, one of the primary objects of the present invention is to provide an improved vessel for a blender comprising a side wall tapering outwardly from the top to the bottom thereof.

Another object of the present invention is to provide a blender vessel having self-clearing means on the inner periphery thereof.

Still another object of the present invention is to provide a blender vessel of a truncated conical vertical section and including a removable base member.

With these and other objects in view which will more readily appear as the nature of the invention is better understood, the invention consists in the novel construction, combination and arrangement of parts as hereinafter more fully described, illustrated and claimed.

A preferred and practical embodiment of the invention is shown in the accompanying drawing, in which:

FIGURE 1 is a top perspective view of the blender vessel of the present invention.

FIGURE 2 is a vertical sectional view of the vessel of the present invention.

FIGURE 3 is a bottom plan view of the vessel as shown in FIGURE 2.

FIGURE 4 is a vertical sectional view taken along the line 4–4 of FIGURE 3.

Similar reference characters designate corresponding parts throughout the several figures of the drawing.

Referring now to the drawing, particularly FIGURE 1, the invention will be seen to comprise a vessel generally designated 1 and which is adapted to be placed upon any suitable type of blender motor unit 2. A cap 3 encloses the vessel top 4 while a base unit 5, containing any suitable type of cutter blades (not shown) is removably attached to the vessel bottom 6 such as by the threads 7 shown most clearly in FIGURE 2. When viewed in elevation as in FIGURE 2 the wall 8 of the vessel 1 will be seen to be tapered inwardly from the vessel bottom 6 to the vessel top 4 so as to provide the cross sectional configuration of a truncated cone. The inner periphery 9 of the vessel wall 8 is preferably cylindrical and substantially smooth except for the addition of self-clearing means which will be described hereinafter. Although the outer periphery 10 of the vessel wall 8 is illustrated in the drawing as comprising a smooth cylindrical surface it will be understood that this portion 10 of the vessel may be suitably shaped to provide any desired appearance.

The cap 3 may be permanently affixed to the vessel top 4 by any suitable means such as by crimping its peripheral edge over the lip formed at the top of the vessel as shown in FIGURE 2, or on the other hand, may be removably attached thereto such as by threads (not shown). For the purpose of manipulating the vessel 1 a handle 11 is suitably attached to the vessel wall 8 such as by the handle brackets 12. The vertical extent of the handle is preferably less than the height of the vessel 1 such that it will not project beyond the top 4 or bottom 6. The ever-increasing diameter of the inner periphery 9 of the vessel from the top 4 to the bottom 6 thereof in itself enhances the free flowing of material being operated upon within the vessel 1; however in order to improve this operation and to further discourage sticking of this material to the inner periphery 9, self-clearing means in the form of a plurality of ribs 13 are provided on the inner periphery 9. These ribs 13 are axially disposed with respect to the center axis of the vessel 1 and project radially inwardly from the inner periphery 9 an ever-increasing amount from the tip 14 thereof to the base 15 thereof. Each rib comprises a pair of side walls 16, each pair of which converges to provide a peak edge 17 for each rib 13. As shown in FIGURE 4 this edge 17 defines a straight line. The ribs terminate at a point spaced from the vessel top 4 with a smooth transition into the inner surface 9. Although four ribs are shown in the drawing it will be understood that other numbers may be provided and in each case they should preferably be symmetrically disposed around the circumference of inner surface 9.

The operation of the vessel will now be described. With the vessel in an inverted position, that is, resting upon the cap 3, the ingredients or mixture desired to be chopped or blended are deposited within the vessel after which the base unit 5 containing the cutting blades is applied to the vessel bottom 6 and retained by means of the threads 7. Then the vessel is returned to the upright position as shown in FIGURES 1 and 2 of the drawing and positioned upon the blender motor unit 2 such as shown in FIGURE 1. When the motor unit is actuated to cause the cutting blades to rotate at a high speed the material within the blender is operated upon by the blades and a corresponding rotary churning motion is accordingly applied to the material. As in all blender vessels, that material immediately adjacent the blades is first acted upon and reduced in size. In the arrangement of the prior known vessels wherein the side walls are vertically disposed or taper inwardly toward the bottom of the vessel, the material in the bottom of the vessel would immediately begin to jam and the very inclination of the vessel wall further enhanced this jamming since the force of gravity upon the yet unaffected material at the top of the vessel acts upon the partially ground material in the lower portion thereof in the manner of a wedge to further jam this material against the inner periphery of the vessel. In the present arrangement, however, an entirely different action takes place. In view of the ever-increasing diameter of the inner periphery 9 from the top 4 to the bottom 6 of the vessel the action of gravity upon the uppermost material within the vessel in a straight vertical downward direction tends to preclude the sticking or jamming of the material against the inner periphery 9 of the vessel. As previously described, the rotating motion of the mixing blades imparts a corresponding swirling or churning motion to the material being acted upon and by means of the self-clearing means 13 of the present invention advantage is taken of this swirling motion of the material to further increase the freedom of movement of the material since it will be seen that as the swirling material strikes the side walls 16 of each rib 13 it will be directed radially inwardly toward the central axis of the vessel 1 and thus will be directed toward the cutting blades themselves which are disposed along the central axis of the vessel.

Upon completion of the blending or chopping operation, the vessel 1 is inverted and the base unit 5 detached to permit removal of the blended material from within the vessel.

I claim:
1. A vessel comprising, an upright sidewall having top and bottom portions and defining a radially enclosed cavity therebetween, said side wall including an inner periphery inclined inwardly from said bottom portion to said top portion, a base member enclosing said bottom portion, and self-clearing means on said inner periphery extending radially into said cavity.

2. A vessel according to claim 1, wherein said inner periphery is cylindrical in horizontal section.

3. A vessel according to claim 1, wherein said inner periphery defines a truncated cone in vertical section.

4. A vessel according to claim 1, wherein said base member is removable.

5. A vessel according to claim 1, including a top cap enclosing said top portion.

6. A vessel according to claim 1, wherein said self-clearing means comprises a rib.

7. A vessel according to claim 6, including a plurality of said ribs equi-spaced from one another.

8. A vessel according to claim 6, wherein said rib is vertically disposed and includes a pair of side walls intersecting to provide a peak edge.

9. A vessel according to claim 6, wherein said rib includes a tip spaced from said top portion and providing a smooth transition with said inner periphery.

10. A vessel according to claim 1, including a bracket extending from the outer surface of said side wall, and a handle attached to said bracket.

References Cited

UNITED STATES PATENTS

| | | | |
|---|---|---|---|
| 3,194,423 | 7/1965 | Mailoff | 215—1 |
| 3,354,603 | 11/1967 | Katzew et al. | 215—1 |

DAVID M. BOCKENEK, Primary Examiner

U.S. Cl. X.R.

220—72, 82, 4, 1; 150—.5